(12) United States Patent
Trummer et al.

(10) Patent No.: US 6,283,696 B1
(45) Date of Patent: Sep. 4, 2001

(54) AIRCRAFT TOWING VEHICLE

(75) Inventors: Gregor Trummer, Aschering; Hartmut Mann; Thomas Fuchs, both of Munich, all of (DE)

(73) Assignee: FMC International AG, Hato Rey Puerto Rico (US)

( * ) Notice: Subject to any disclaimer, the term of this patent is extended or adjusted under 35 U.S.C. 154(b) by 0 days.

(21) Appl. No.: 09/424,107

(22) PCT Filed: May 8, 1998

(86) PCT No.: PCT/EP98/02708
§ 371 Date: Feb. 7, 2000
§ 102(e) Date: Feb. 7, 2000

(87) PCT Pub. No.: WO98/52822
PCT Pub. Date: Nov. 26, 1998

(30) Foreign Application Priority Data

May 21, 1997 (DE) .............................. 197 21 315

(51) Int. Cl.[7] ...................................................... B64F 1/22
(52) U.S. Cl. ........................... 414/426; 414/428; 414/429
(58) Field of Search .................................. 414/426, 427, 414/428, 429, 430; 74/99 R; 172/311

(56) References Cited

U.S. PATENT DOCUMENTS

| | | | |
|---|---|---|---|
| 4,030,551 | * 6/1977 | Boetto et al. | 172/311 X |
| 4,418,763 | * 12/1983 | Boetto | 172/311 X |
| 4,453,601 | * 6/1984 | Orthman et al. | 172/311 |
| 5,031,892 | * 7/1991 | Stieger | 74/99 X |
| 5,336,037 | * 8/1994 | Curten et al. | 414/429 |
| 5,549,436 | * 8/1996 | Fresia | 414/426 |
| 5,860,785 | * 1/1999 | Eberspacher | 414/428 |

FOREIGN PATENT DOCUMENTS

| | | |
|---|---|---|
| 4415405 A1 | 11/1995 | (DE) . |
| 4446048 A1 | 7/1996 | (DE) . |
| 0 276 779 A1 | 8/1988 | (EP) . |
| 0 644 115 A1 | 3/1995 | (EP) . |

* cited by examiner

*Primary Examiner*—Steven A. Bratlie

(57) ABSTRACT

An aircraft towing vehicle includes a lifting and locking device for the nose landing gear of the aircraft being towed. The device has two support elements which reach behind the nose wheels and can be displaced along straight-line guiding rails by a linear drive so as to pull the nose wheels of the aircraft onto a lifting platform and to lock it into place thereon. At the end of each guiding rail a guiding pin is provided which, in cooperation with a guiding track embodied in the support element, controls the rotation of the support element into a release position in which the nose landing gear is able to pass through. By a reverse movement, the rotation of the support elements are put into the operation position in which the support elements reach behind the nose landing gear.

17 Claims, 5 Drawing Sheets

AIRCRAFT TOWING VEHICLE

FIELD OF THE INVENTION

The present invention relates to vehicles, and, more particularly, to an aircraft towing vehicle.

BACKGROUND OF THE INVENTION

A typical aircraft towing vehicle is disclosed in Patent DE 4,446,048 A1, and with aircraft towing vehicles of this type, the locking to the nose landing gear of an airplane to be towed takes place in such a manner, whereby the aircraft towing vehicle with support elements in a pivoted release position approaches the nose landing gear so that the nose wheels are located in the U-section of the chassis. Subsequently, the support elements are rotated into an operating position in which they reach behind the nose wheels and the nose wheels are pulled by means of the support elements on a lifting platform, are lifted and supported by the lifting platform and locked onto same.

With the aircraft towing vehicle known from Patent DE 4,446,048 A1 each support element is guided by the guiding rail associated with it, by means of an anterior and a posterior roller, and each guiding track is angled outward so that with the approach of the support element to the posterior end of the guiding rail, a rotational movement of the support element into a release position is forced. This means an advantageous simplification as compared to other known aircraft towing vehicles, for example those described in Patent DE 3,732,664 A1 or U.S. Pat. No. 4,375,244, in which cases it is necessary for each supply element with a linear drive moving longitudinally to employ an additional rotational drive for the locking and release rotational movement of the support element.

The design known from Patent DE 4,446,048 A1 with outwardly angled guiding rails, however, also has disadvantages. One disadvantage lies in the fact that the angled end sections of the guiding rails which surround the two flanks of the chassis at the rear, extend the chassis in an undesirable manner. Hereby it is to be considered that instead of the rectangular strong angling as seen in a simplified drawing in Patent DE 4,446,048 A1, in practical cases an angling with a much greater radius is needed in order to be able to control a more even rotational process of the support elements. Besides that, the manufacture of such angled guiding rails is expensive, and since they must be heavy and massive parts, and because of the angled part of each guiding rail, the weight of the vehicle is increased to an undesirable degree.

SUMMARY OF THE INVENTION

The invention is based on the task to design an aircraft towing vehicle of the kind as described, in such a manner, as to achieve control of the rotation of the support elements from the operating into a release position, and vice versa, exclusively by implementation of the linear drive without the necessity of a angling or curved extension of the guiding rails.

In the case of the aircraft towing vehicle of the invention a guiding function by which a linear forward and backward movement of the support elements are converted into a rotational movement is not achieved by the guiding rail but by a mobile guiding track embodied in the support element into which a stationary guiding pin engages at the guiding rail.

The guiding track may run straight, whereby an arrangement of the guiding pin which is eccentric to the operational line of the linear drive, supplies the necessary controls of the rotation of the support element.

The guiding track, however, may be curved like a kind of guiding profile, or may have a slanted section controlling the rotational movement of the support element.

Since the guide rail does not have to control the rotational movement of the support element, it may be designed purely straight-lined and may be essentially shorter than the guiding rail known so far. This allows shorter structural length, a lighter weight and results in lower manufacturing costs.

BRIEF DESCRIPTION OF THE DRAWING

Forms of execution of the invention are further detailed hereafter, using the attached drawings. They show.

DETAILED DESCRIPTION OF THE PREFERRED EMBODIMENTS

Figure 1:
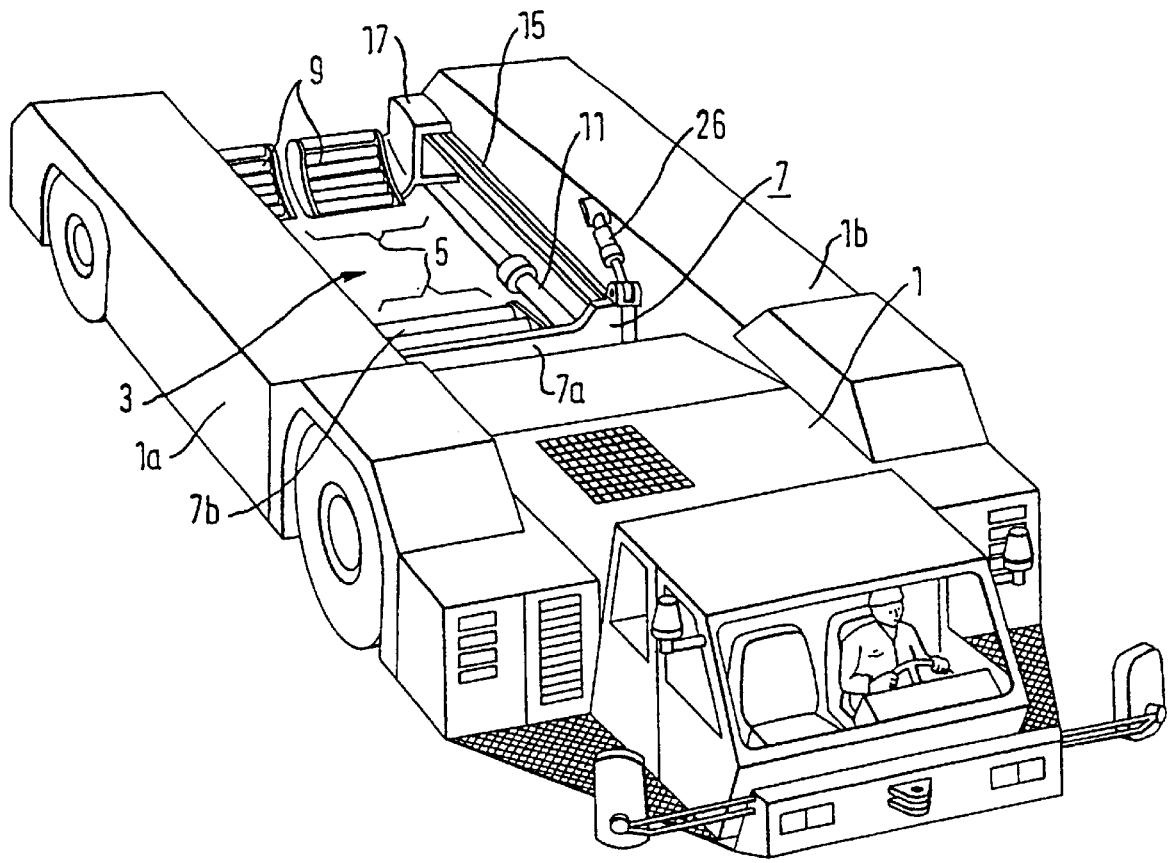
FIG. 1 is a schematic isometric view of the aircraft towing vehicle of the invention.

The aircraft towing vehicle represented in FIG. 1 has a chassis 1, which, at its posterior area is cut out in a U-shape in order that two chassis flanks 1A and 1B confine a sector which is situated between them and which is open to the posterior end. In the U-shaped section 3, the lifting-platform and locking device 5 is located by means of which the nose wheels of an airplane may be captured, lifted, supported and locked. The essential components of the lifting and locking device 5 are a lifting platform 7 with an anterior wall 7A which is approximately plumb and a base surface 7B with rollers, approx. horizontal, as well as two support elements 9, which reach behind the nose wheels of an airplane and can be displaced by means of a linear drive 11, each, especially by a hydraulic cylinder, whereby the supply elements are pressed against the nose wheels so as to pull the nose wheels of the aircraft onto the lifting platform 7 and to lock it into place thereon.

The entire lifting and locking device is located at the chassis 1 around a central axis running in longitudinal direction of the vehicle and may be rotated freely. By means of hydraulic cylinders 26 which connect the lifting platform with the chassis, the entire lifting and locking device 5 may be rotated up or down around a lateral transverse axis in order to be able to lift or lower the landing nose gear of an airplane which had been placed on the lifting platform 7. For details of the construction and the operation of the lifting and locking device 5, please see the already mentioned Patent DE 44 46 048 A1.

On each side of the lifting platform 7, seen in a cross section, an H-shaped guiding rail 15 is attached which runs parallel to the chassis flanks 1A, 1B and backwards. Each guiding rail 15 has a sled 17 which may be displaced longitudinally, connected rigidly with the corresponding support element 9. By means of a linear drive, especially by a hydraulic cylinder 11 and a sled 17, carrying the support element 9 along the guiding rail may be moved backwards or forwards, respectively. The hydraulic cylinder 11 which is serving as the linear drive, as shown in FIG. 1, may be located underneath the guiding rail 15 or above same, as shown in the additional drawings.

Figure 2:
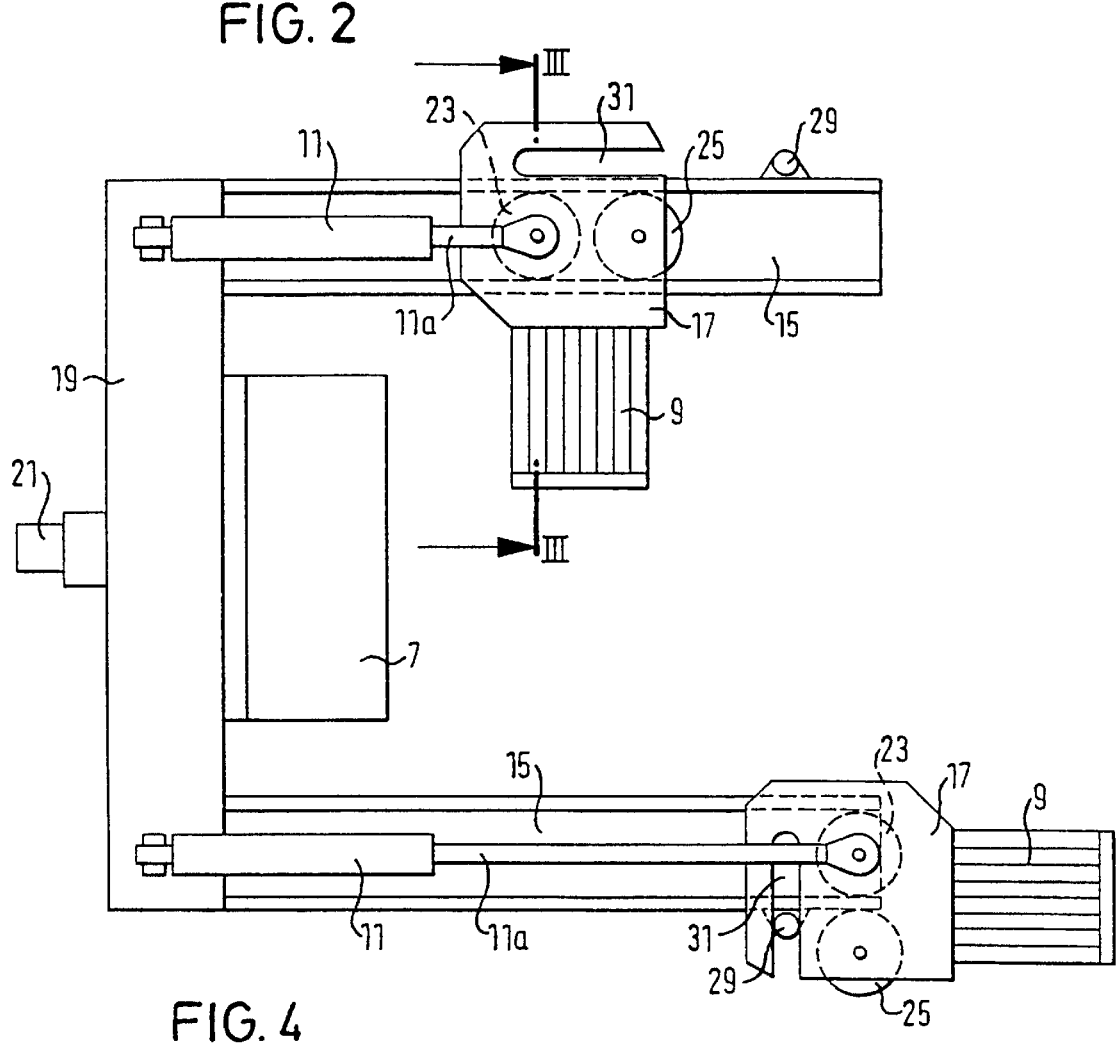
FIG. 2 is a top view of the lifting and locking device according to a first example of the invention.
Figure 3:
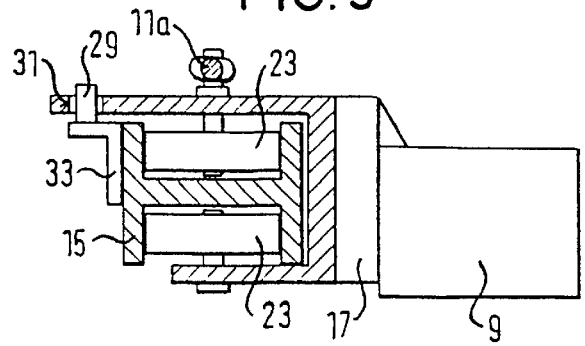
FIG. 3 is a schematic cross section along line III—III of FIG. 2

FIG. 2 shows a schematic top view, of the first embodiment of the lifting and connecting device. It contains a transverse carrier/beam 19 which is resting by means of a bearing stud 21 at the chassis about a horizontal longitudinal axis and is freely rotatable in order that the entire lifting and locking device may follow the engaged nose landing gear when, for example, it might be leaning in a declined position around corners. A provision of steering devices (not shown) which are formed as hydraulic cylinders stabilize the lifting and locking devices during their pendulum motion as described further in Patent DE 4,446,048 A1. The transverse piece 19 bears the lifting platform 7 and the two guiding rails 15. Additionally, the hydraulic cylinders 11 are connected at the transverse piece 19. The piston rod 11a of each hydraulic cylinder 11 is movably connected with a sled 17 carrying a support element 9. Via anterior and posterior guiding rollers 23, 25 each sled 17 is guided at the guiding rail 15 associated with it. The anterior and posterior guiding rollers 23, 25 consist, in each case, of a pair of guiding rollers which lock into the upper and lower channel of the H-shaped guiding rail, as shown in FIG. 3 for the anterior guiding rollers 23. The sled 17 has a U-shape surrounding the guiding rail 15. The piston rod 11a of the hydraulic cylinder 11 associated with it preferably is linked coaxially to the posterior guiding rollers 23 at the sled 17.

Each guiding rail 15 runs linear along its entire length. Close to the posterior end of the guiding rail 15, at the exterior side, i.e. eccentrically to the longitudinal center axis of the guiding rail 15, a guiding pin 29 is attached. This pin 29, works together with a guiding track 31 of the sled 17 of the support element 9, whereby the guiding track 31—in the example shown—has the form of a straight slit, open to the back. The guiding pin 29, as shown in FIG. 3, may be fastened by an angle piece 33 to the exterior side of the guiding rail 15.

As long as the anterior and posterior guiding rollers 23, 25 are engaged with the guiding rail 15, the sled 17 with the support element 9 is supported non-rotatable in the guiding rail 15, and the support element 9 is blocked in the operating position which is transverse to the guiding rail 15, as may be seen at the upper part of FIG. 2. When the sled 17, by outward movement of the hydraulic cylinder 11 has been moved backward to the extent that the posterior guiding roller 25 loses its support at the guiding rail 15, then the sled 17 is able to revolve around the axis of the anterior guiding roller 23. At first, this is still prevented by the guiding pin 29 which has entered the guiding track 31. However, with further moving backward of the sled 17, with the axis of the anterior guiding roller 23 reaching about the same height as the guiding pin 29, then the rotational force created by the thrust put forth by the hydraulic cylinder 11 on the guiding pin causes the sled 17 to rotate around the axis of the anterior guiding roller 23 so that the sled 17 is rotated around the axis of the anterior guiding roller 23, and the support element 9 is set into a release position, as shown in the lower half of FIG. 2, whereby it is located parallel to the longitudinal direction of the aircraft towing vehicle and in which position it does not prevent engagement of the nose landing gear of an airplane in the space between the guiding rails 15. When retracting the piston rod 11a, the guiding pin 29 which is pressing against the flank of the guiding track 31, incites a rotational motion of the sled 17 with the support element 9, i.e. back into the operational position. It is understood that the two hydraulic cylinders 11 are always activated in synchronism so that uneven positions of the right and left support element—as shown in FIG. 2 for purposes of simplicity—do not occur in practical applications.

Figure 5A:
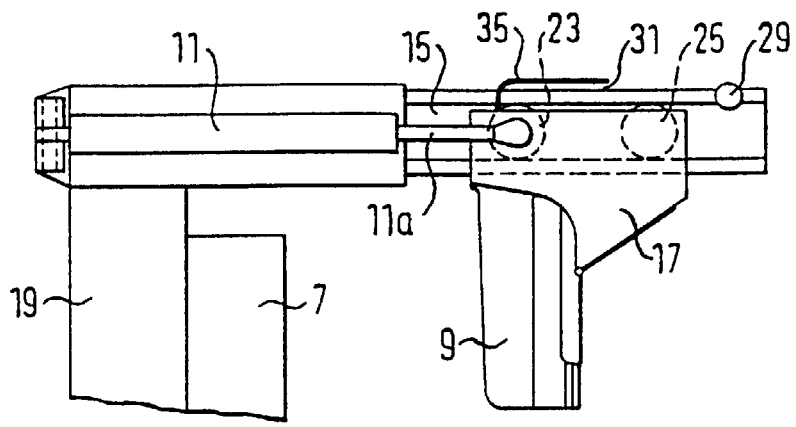
FIGS. 5A, 5B, and 5C are top plan views of one of the two support elements in operational position in partially outward rotated position and in the rotated release position.
Figure 5B:
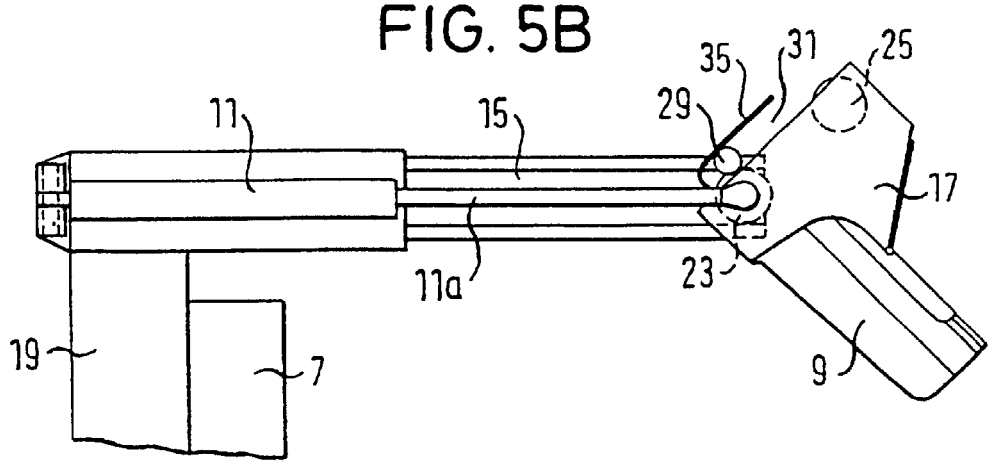
Figure 5C:
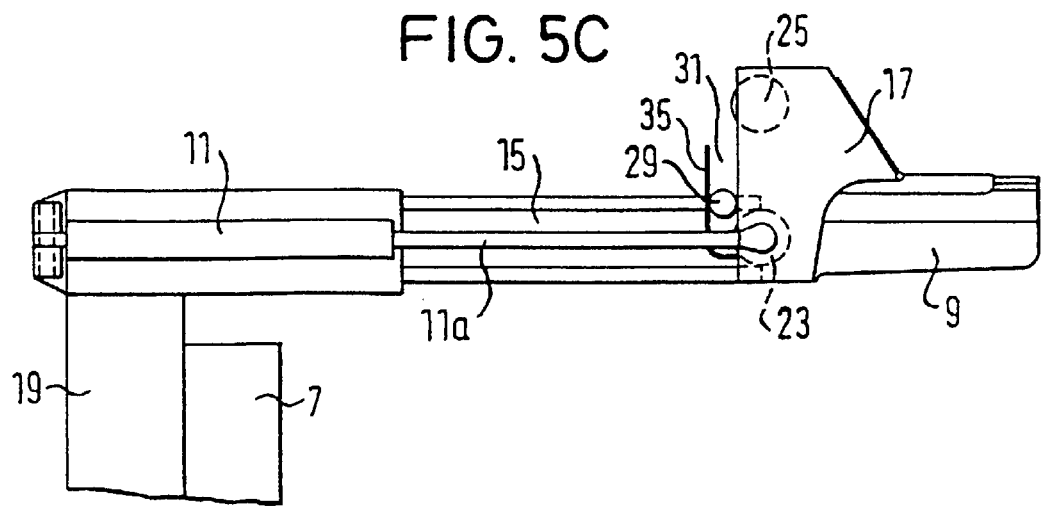

FIGS. 5A, 5B, and 5C show 3 phases of the outward rotational process of a support element in a design similar to that shown in FIG. 2, which, however, is represented in a more conventional application. The same reference symbols are used as in FIG. 2. The guiding pin 29, in this case, is placed onto the outer flange of the guiding rail 15. The guiding track 31 working together with it is formed by a hook-like part 35 fastened to the sled 17. FIG. 5A shows the sled 17 with the support element 9 with retracted piston rod 11a in the operational or locked position, whereby the anterior and posterior guiding rollers 23, 25 are engaged with the straight-line guiding rail 15. FIG. 5B shows a partially outward rotated position of the sled 17 with the support element 9, whereby the posterior guiding roller 23 is no longer engaged with the guiding rail and the guiding pin 29 has entered the guiding track 31 and by pressing against the hook-shaped element 35, the rotational force for the rotational process of the sled 17 is generated. FIG. 5C shows the position with maximum extension force of the piston rod 11a, whereby the sled 17 along with the support element 9 has been rotated by 90° in the release position as compared to the position in FIG. 5A.

Starting from this position, if the piston rod 11a is retracted again and moved to the left, then the guiding pin 29 presses against the side plane of the sled 17 confining the guiding track 31 and incites a rotating movement around the axis of the anterior guiding roller 23, by which the sled 17 with the support element 9 is rotated back in the operating position, according to 5A via the interim position, according to FIG. 5B Hereby, also the posterior guiding roller 25 may engage with the guiding rail 15.

Figure 6A:
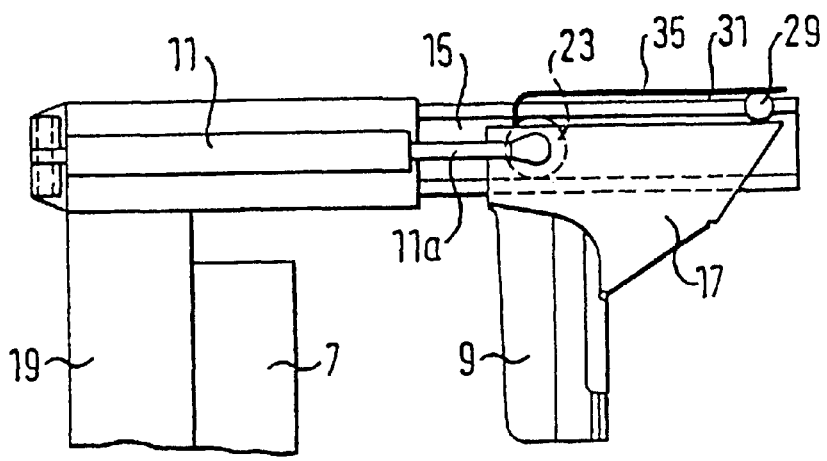
FIGS. 6A, 6B, and 6C, as well as FIGS. 7A, 7B and 7C, are similar illustrations to 5A, 5B and 5C of two modified forms of the invention.
Figure 6B:
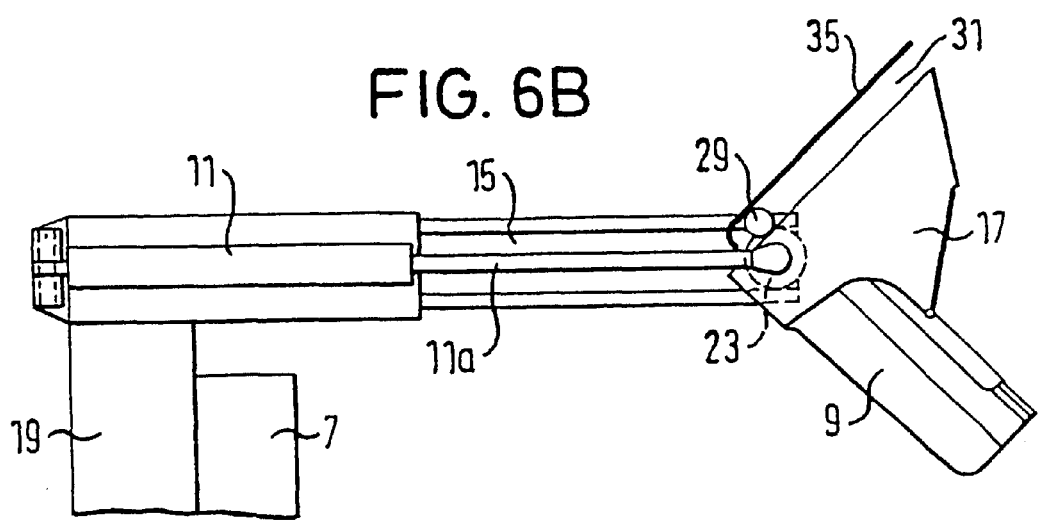
Figure 6C:
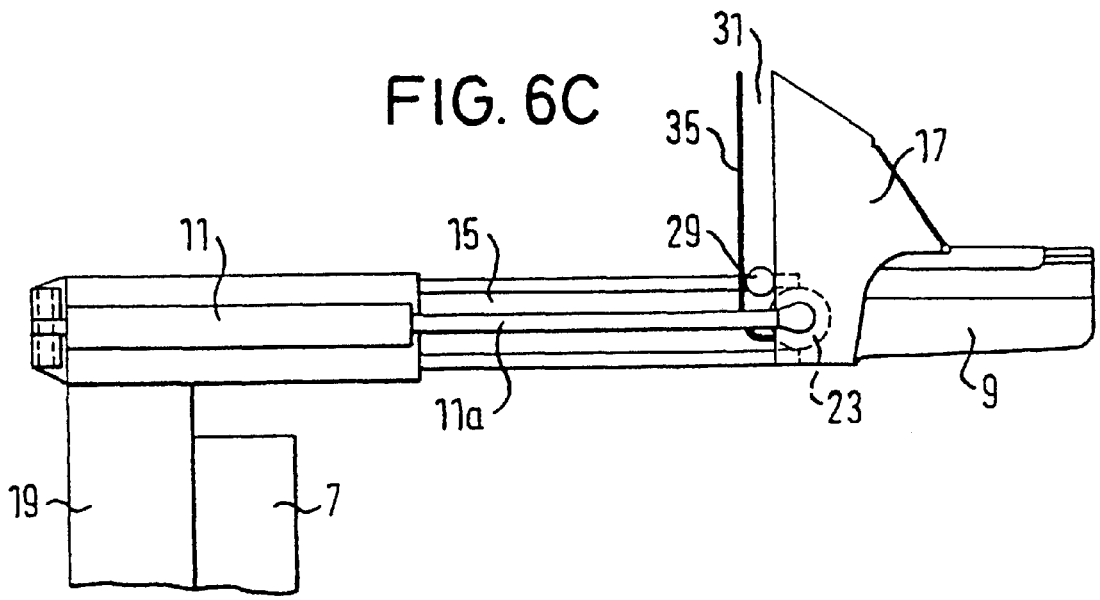

FIGS. 6A, 6B and 6C show the analogous positions relating to an alternate embodiment, in which the sled 17 is guided at the guiding rail 15 only with the anterior pair of guiding rollers 23. A second, posterior pair of guiding rollers is absent. In order to still ensure a non-rotatable support of the sled 17 at the guiding rail 15, in the operating position, (FIG. 6A), the length of the sled 17 and the hook-shaped part 35 fastened to it is lengthened in a fashion in order that in the operational position, already shown in FIG. 6A with maximum retracted piston rod 11A, the guiding pin 29 engages with the guiding track 31 formed between the hook-shaped part 35 and the sled 17 and assumes the lateral support of the sled 17. Analogous to the FIGS. 5B and 5C, also with this execution form, the rotation of the sled 17 with support element 9 begins when the piston rod 11A is being extended out so far that the axis of the guiding roller 23 is located approximately at the same height as the guiding pin 29. A minute further ex tension of the piston rod 11a, whereby the guiding roller does not lose its engagement with the guiding rail 15, accomplishes the final rotation into the release position of the support element 9, shown in FIG. 6C.

Figure 4:
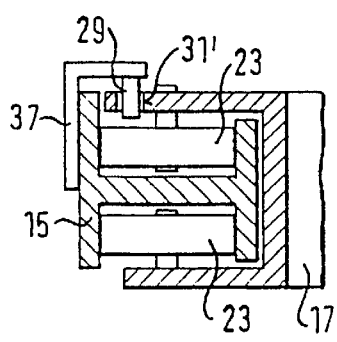
FIG. 4 is an illustration, similar to FIG. 3, a of an alternate embodiment.
Figure 7A:
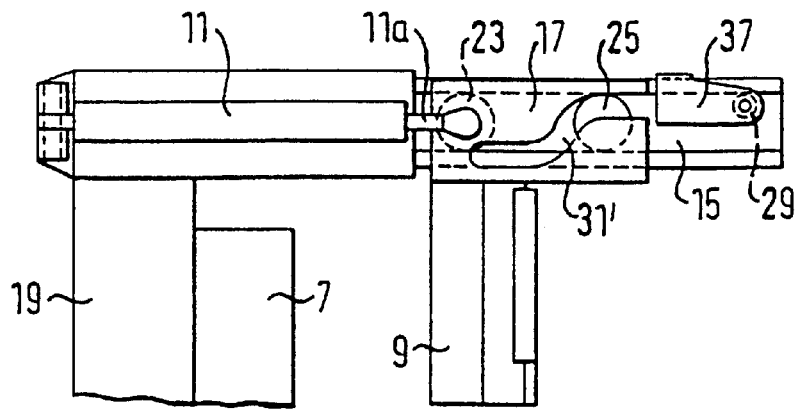
Figure 7B:
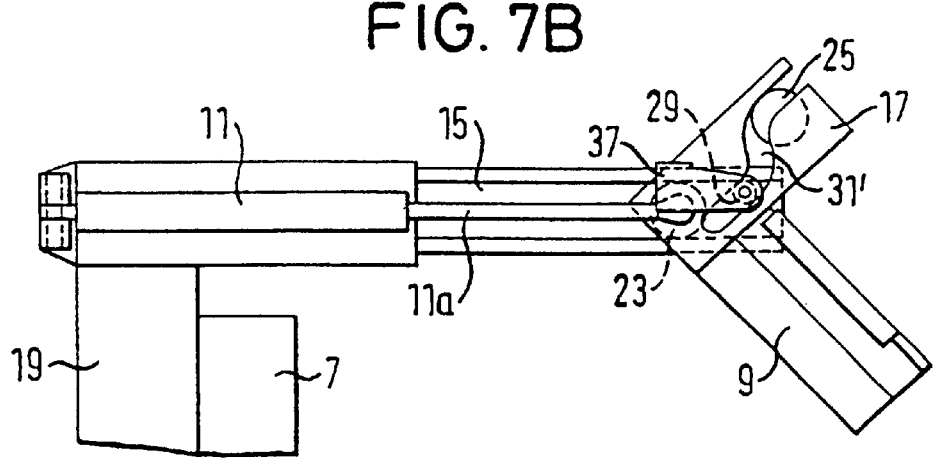
Figure 7C:
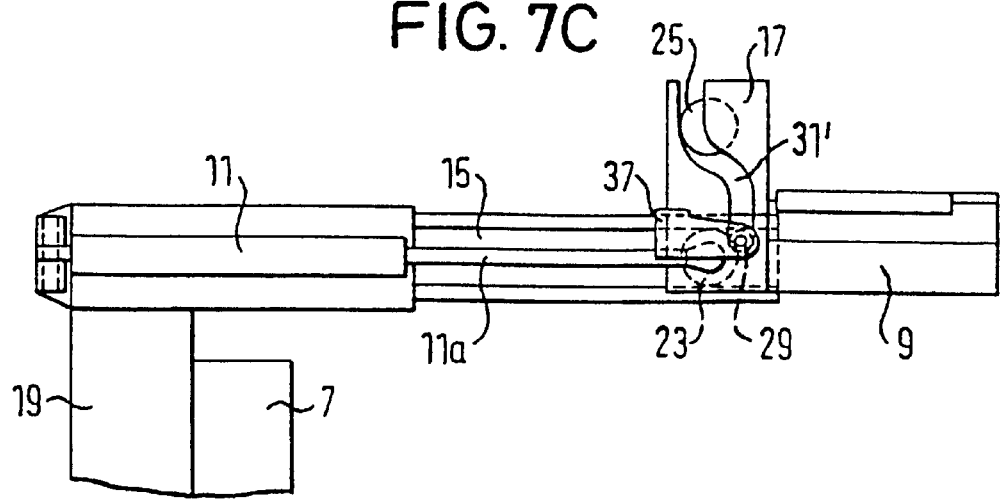

In the example shown in FIGS. 7A, 7B, and 7C, the sled 17 with anterior and posterior guiding rollers 23, 25 which is carrying the support element 9 is engaged with the guiding rail 15. Contrary to the examples according to FIGS. 2, 5A and 6A, the guiding track 31' which is controlling the rotational movement of the sled 17 is not linear but is comprised of an S-shaped, curved slit which is formed in the upper wall of the sled 17. The guiding pin 29 which is working together with the slit 31', in this case is attached above the guiding rail 15 by means of a angle piece 37 which is angled inward, as shown schematically in FIG. 4. Corresponding to its S-shape, the guiding slit 31' includes two straight end sections which run longitudinally and a slanted center section, located in between the latter, which works together with the guiding pin 29, forcing a rotational movement of the sled 17, outwardly, around the axis of the anterior guiding roller; this is done at a point in time when the posterior guiding roller 23 has left the guiding rail 15 as shown in FIGS. 7B and 7C.

Figure 8:
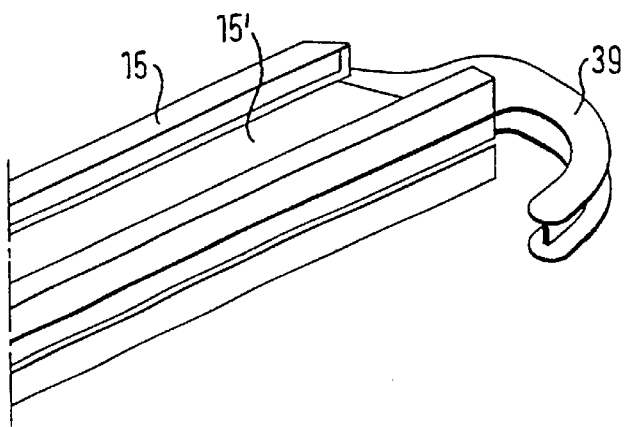
FIG. 8, is a perspective view illustrating a detail at the end of the guiding rail according to a further embodiment of the invention.

With all illustrated examples, the guiding rollers 23, 25 in cooperation with the guiding rail 15 must not only control the lateral guidance and stabilization of the sled 17 with the support element 9, but must also support the weight of the sled 17 with the support element 9 at the guiding rail 15. If, for example, in the positions according to FIGS. 5B, 6B, and 7B only the anterior guiding roller, each, is still engaged with the guiding rail 15, then the weight of the posterior part of the sled 17 is not supported any longer at the guiding rail 15. Thus, the danger exists, that the sled 17 with the support element 9 sags or twists, respectively, relative to the guiding rail 15. In order to prevent this from happening, according to another form of execution of the invention, as schematically presented in FIG. 8, at the posterior end of each guiding rail 15, an extension piece 39 may be attached, which is horn-shaped and is angled off outwardly from the guiding rail 15. This extension piece 39 has the same thickness as the center section 15' of the H-shaped guiding rail 15 and serves for bracing the underside of the upper posterior guiding roller 25, when it has left the guiding rail 15 and together with the sled 17 is rotated outwardly. In this manner, the sled 17 with the support element 9 is also supported, as to its weight, in the rotating process and in the fully outwardly rotated release position and cannot twist relative to the guiding rail 15. In comparison to the slanting of the entire guiding rail as known from DE 4,446,048 A1, the embodiment shown in FIG. 8, by the guiding rail 15 simply having a center portion containing a horn-shaped extension 39 results in an essentially lower increase in weight, space and costs of the guiding rail. The advantages of the invention as mentioned initially as compared to the known, slanted guiding rail are therefore also substantially attained with the embodiment according to FIG. 8.

What is claimed is:

1. An aircraft towing vehicle comprising:
    a chassis having a U-shaped section open to the rear; and
    a lifting and locking device carried in the U-shaped section of said chassis for engaging with nose wheels of an aircraft, said lifting and locking device comprising
        a lifting and lowering platform for support of the nose wheels,
        two guiding rails carried by the lifting and lowering platform and extending in a longitudinal direction of said chassis, each guiding rail extending along a substantially straight line without slanting,
        a support element being movable along each guiding rail for reaching behind and locking the nose wheels, each support element including portions defining a guide track,
        a linear drive for moving each support element along a respective guiding rail, and
        a guiding pin located adjacent the rear of each guiding rail and cooperating with a respective guide track for causing rotation of each support element adjacent a rear of a respective guiding rail around an essentially vertical axis from an operational position, extending transverse to the longitudinal direction of the chassis, to a release position, approximately parallel to the longitudinal direction of said chasis, to permit entry of the nose wheels into the U-shaped section of said chasis,
        whereby as each support element approaches the rear end of a respective guiding rail, the respective guiding pin is engaged in the respective guiding track to control rotational movement of the support element.

2. An aircraft towing vehicle according to claim 1, wherein each guiding track includes portions extending straight and parallel to a respective guiding rail; and wherein the guiding pin is located across from a contact point of the linear drive.

3. An aircraft towing vehicle according to claim 1, wherein each guiding track has a profile form with a portion thereof extending transverse to a longitudinal direction of the guiding rail.

4. An aircraft towing vehicle according to claim 1, further comprising front and rear rollers for each support element; and wherein the rear roller disengages from the guiding rail after the guiding pin has entered into the guiding track.

5. An aircraft towing vehicle according to claim 4, further comprising a joint coaxial to a respective front roller and to which the linear drive is connected.

6. An aircraft towing vehicle according to claim 1, wherein each guiding rail is rigidly connected to the lifting and lowering platform and that together therewith is rotational upwards and downwards.

7. An aircraft towing vehicle according to claim 1, further comprising an outwardly slanted member connected adjacent the rear of a respective guiding rail for supporting a respective support element when in the release position.

8. An aircraft towing vehicle comprising:
    a chassis having a U-shaped section open to the rear; and
    a lifting and locking device carried in the U-shaped section of said chassis for engaging with nose wheels of an aircraft, said lifting and locking device comprising
        a lifting and lowering platform for support of the nose wheels,
        two guiding rails carried by the lifting and lowering platform, each guiding rail extending along a substantially straight line without slanting,
        a support element being movable along each guiding rail for reaching behind and locking the nose wheels,
        a drive for moving each support element along a respective guiding rail, and
        a guide device located adjacent the rear of each guiding rail and cooperating with a respective support element for causing rotation thereof at a rear of a respective guiding rail from an operational position.

9. An aircraft towing vehicle according to claim 8, wherein each support element includes portions defining a guide track; and wherein each guide device comprises a guide pin carried by a respective guiding rail and cooperating with a respective guide track for rotating the support element.

10. An aircraft towing vehicle according to claim 9, wherein each guiding track includes portions extending straight and parallel to a respective guiding rail; and wherein the guiding pin is located across from a contact point of the linear drive.

11. An aircraft towing vehicle according to claim 9, wherein each guiding track has a profile form with a portion thereof extending transverse to a longitudinal direction of the guiding rail.

12. An aircraft towing vehicle according to claim 9, further comprising front and rear rollers for each support element; and wherein the rear roller disengages from the guiding rail after the guiding pin has entered into the guiding track.

13. An aircraft towing vehicle according to claim 8, further comprising a joint coaxial to a respective front roller and to which the drive is connected.

14. An aircraft towing vehicle according to claim 8, wherein each guiding rail is rigidly connected to the lifting and lowering platform and that together therewith is rotational upwards and downwards.

15. An aircraft towing vehicle according to claim 8, further comprising an outwardly slanted member connected adjacent the rear of a respective guiding rail for supporting a respective support element when in the release position.

16. A method for operating an aircraft towing vehicle comprising a lifting and lowering platform, two guiding rails carried by the lifting and lowering platform, a support element and associated drive for moving the support element along a respective guiding rail, a guide device located adjacent the rear of each guiding rail, the method comprising:

moving each support element rearward so that each guide device cooperates with a respective support element for causing rotation thereof at a rear of a respective guiding rail from an operational position, extending transverse to the longitudinal direction of the chassis, to a release position, to permit entry of the aircraft nose wheels, each guiding rail extending along a substantially straight line without slanting;

moving each support element forward to capture the aircraft nose wheels; and raising the lowering and lifting platform to a raised position.

17. A method according to claim 16, wherein each support element includes portions defining a guide track; and wherein each guide device comprises a guide pin carried by a respective guiding rails and cooperating with a respective guide track for rotating the support element.

\* \* \* \* \*